(12) United States Patent
Kakutani

(10) Patent No.: US 8,305,029 B2
(45) Date of Patent: Nov. 6, 2012

(54) FAN DRIVE APPARATUS AND IMAGE FORMING APPARATUS HAVING FAN DRIVE APPARATUS

(75) Inventor: Toshifumi Kakutani, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 12/489,047

(22) Filed: Jun. 22, 2009

(65) Prior Publication Data

US 2009/0324276 A1    Dec. 31, 2009

(30) Foreign Application Priority Data

Jun. 30, 2008  (JP) ................. 2008-171734

(51) Int. Cl.
*B41J 29/377*    (2006.01)
*B41J 2/165*    (2006.01)
*G05B 11/01*    (2006.01)

(52) U.S. Cl. .......... 318/798; 318/805; 318/432; 347/34; 347/18; 101/424.1

(58) Field of Classification Search ................. 318/798, 318/799, 805, 432, 433, 641, 400.08; 347/18, 347/34, 101, 102, 32, 33, 25; 101/424.1, 101/487, 488, 416.1; 346/25; 399/92

See application file for complete search history.

(56) References Cited

U.S. PATENT DOCUMENTS

| | | | | |
|---|---|---|---|---|
| 4,392,741 A | * | 7/1983 | Inuzuka et al. | 399/32 |
| 5,081,496 A | * | 1/1992 | Takeda | 399/92 |
| 5,296,873 A | * | 3/1994 | Russell et al. | 346/25 |
| 5,329,295 A | * | 7/1994 | Medin et al. | 346/25 |
| 5,406,316 A | * | 4/1995 | Schwiebert et al. | 347/18 |
| 6,059,406 A | * | 5/2000 | Richtsmeier et al. | 347/102 |
| 6,203,152 B1 | * | 3/2001 | Boleda et al. | 347/102 |
| 6,281,910 B1 | * | 8/2001 | Nakano et al. | 347/34 |
| 6,340,225 B1 | * | 1/2002 | Szlucha | 347/102 |
| 6,561,621 B2 | * | 5/2003 | Webster et al. | 347/34 |
| 6,712,448 B2 | * | 3/2004 | Tsurui | 347/34 |
| 7,044,581 B2 | * | 5/2006 | Shimoyama | 347/34 |
| 7,138,781 B2 | * | 11/2006 | Murray et al. | 318/400.04 |
| 2006/0290895 A1 | * | 12/2006 | Park et al. | 353/61 |
| 2009/0214250 A1 | * | 8/2009 | Mikuni | 399/92 |
| 2011/0085818 A1 | * | 4/2011 | Ukai | 399/92 |
| 2012/0114400 A1 | * | 5/2012 | Wazumi et al. | 399/323 |
| 2012/0140402 A1 | * | 6/2012 | Mizumura et al. | 361/679.33 |

FOREIGN PATENT DOCUMENTS

JP    2004-129383 A    4/2004

* cited by examiner

*Primary Examiner* — Eduardo Colon Santana
(74) *Attorney, Agent, or Firm* — Canon USA Inc. IP Division

(57) ABSTRACT

A fan drive apparatus includes a first fan, a second fan configured to form an air flow space, which has an intake side and an exhaust side, in cooperation with the first fan, a first drive circuit and a second drive circuit configured to output drive voltages to drive the first fan and the second fan respectively, a current detection unit configured to detect a drive current for the second drive circuit when the first fan and the second fan are driven, and a control unit configured to control the second drive circuit to change the drive voltage applied to the second fan, and determine a drive voltage so that a variation amount of the drive current detected by the current detection unit with respect to a change of the drive voltage is equal to or less than a predetermined value.

12 Claims, 11 Drawing Sheets

FIG. 6

| DRIVE VOLTAGE (V) | DRIVE CURRENT (mA) | CURRENT INCREASE AMOUNT (mA) |
|---|---|---|
| 21 | 55 | − |
| 21.5 | 56.5 | 1.5 |
| 22 | 58 | 1.5 |
| 22.5 | 59.5 | 1.5 |
| 23 | 60 | 0.5 |
| 23.5 | 61.5 | 1.5 |
| 24 | 63 | 1.5 |
| 24.5 | 64.5 | 1.5 |
| 25 | 66 | 1.5 |

FIG. 10

| DRIVE VOLTAGE(V) | ROTATION NUMBER(rpm) | ROTATION NUMBER INCREASE AMOUNT(rpm) |
|---|---|---|
| 21 | 3770 | - |
| 21.5 | 3835 | 65 |
| 22 | 3900 | 65 |
| 22.5 | 3965 | 65 |
| 23 | 4065 | 100 |
| 23.5 | 4130 | 65 |
| 24 | 4195 | 65 |
| 24.5 | 4260 | 65 |
| 25 | 4325 | 65 |

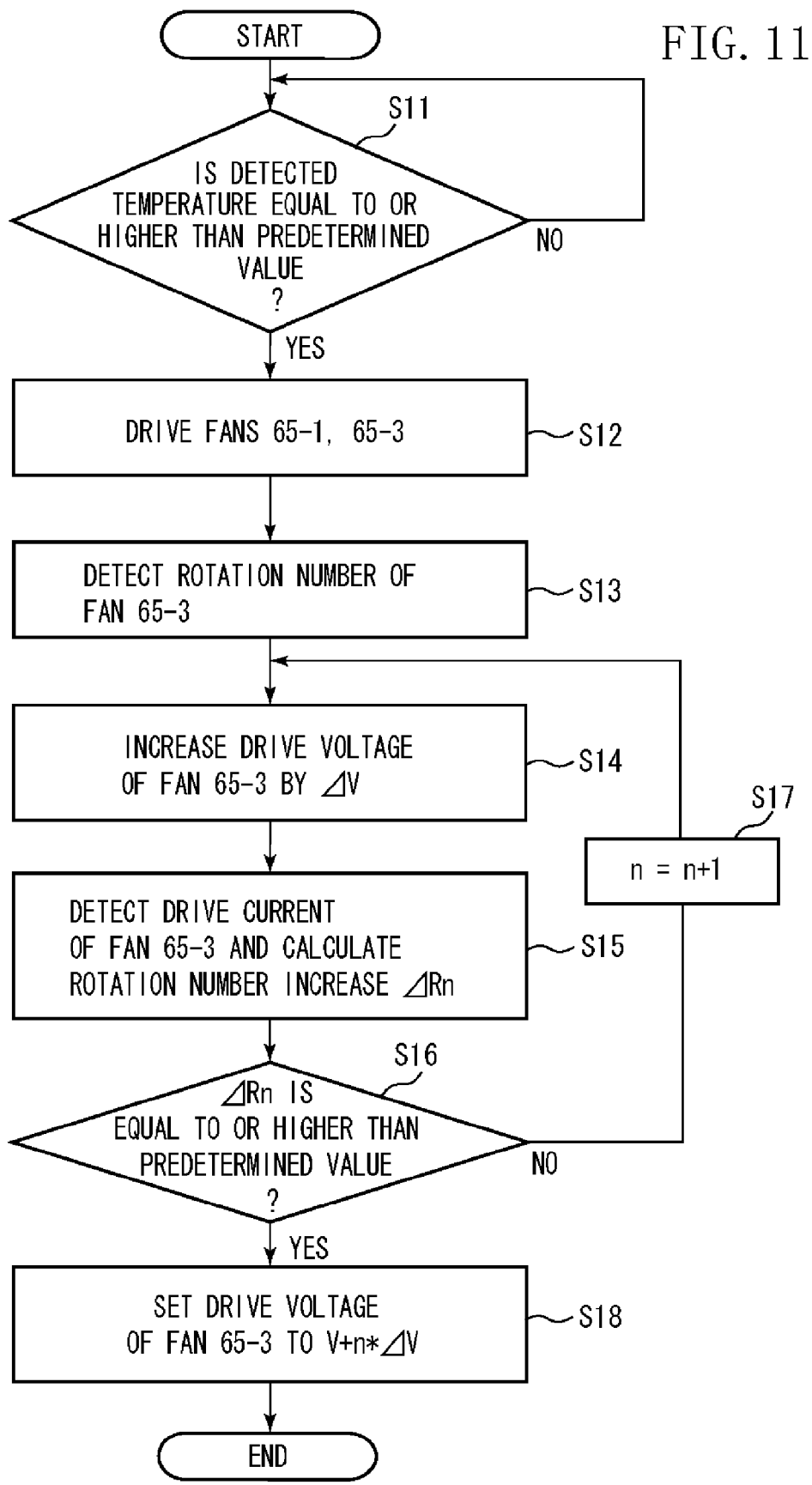

FAN DRIVE APPARATUS AND IMAGE FORMING APPARATUS HAVING FAN DRIVE APPARATUS

BACKGROUND OF THE INVENTION

1. Field of the Invention

The present invention relates to a fan drive apparatus and particularly a fan drive apparatus mounted on an image forming apparatus, and also relates to an image forming apparatus having the fan drive apparatus.

2. Description of the Related Art

In a conventional image forming apparatus, fans are generally used to suppress temperature rise in the apparatus caused by thermal fixing of toner particles and heat generated by motor operation. A plurality of fans are often equipped within an image forming apparatus when efficient air flow is needed for cooling. However, the use of a plurality of fans generates noise associated with the apparatus. Japanese Patent Application Laid-Open No. 2004-129383 discusses a method for controlling the plurality fans in such a manner that the air volume is controlled to be a specified air volume.

However, according to the method discussed in Japanese Patent Application Laid-Open No. 2004-129383, if the conditions of the air flow space vary due to changes in the operating conditions of the apparatus, the fan load may increase. Consequently, the driving power supplied to the fans increases which results in increased power consumption.

SUMMARY OF THE INVENTION

According to an aspect of the present invention, a fan drive apparatus includes a first fan, a second fan configured to form an air flow space in cooperation with the first fan, a first drive circuit and a second drive circuit configured to output drive voltages to drive the first fan and the second fan respectively, a current detection unit configured to detect a drive current for the second drive circuit when the first fan and the second fan are driven, and a control unit configured to control the second drive circuit to change the drive voltage applied to the second fan, and determine a drive voltage so that a variation amount of the drive current detected by the current detection unit with respect to a change of the drive voltage is equal to or less than a predetermined value.

According to another aspect of the present invention, a fan drive apparatus includes a first fan, a second fan configured to form an air flow space, which has an intake side and an exhaust side, in cooperation with the first fan, a first drive circuit and a second drive circuit configured to output drive voltages to drive the first fan and the second fan respectively, a current detection unit configured to detect a drive current for the second drive circuit when the first fan and the second fan are driven, and a control unit configured to control the second drive circuit to change the drive voltage applied to the second fan, and determine a drive voltage so that a variation amount of the drive current detected by the current detection unit with respect to a change of the drive voltage is equal to or less than a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table illustrating the relationship among drive voltage, drive current, and amount of drive current increase of a fan according to the first exemplary embodiment of the present invention.

FIG. 10 is a table illustrating the relationship among drive voltage, rotation number, and amount of rotation number increase according to the second exemplary embodiment of the present invention.

FIG. 11 is a flowchart illustrating a drive control procedure of a fan according to the second exemplary embodiment of the present invention.

DETAILED DESCRIPTION OF THE EMBODIMENTS

Various exemplary embodiments, features, and aspects of the invention will be described in detail below with reference to the drawings.

Figure 1:
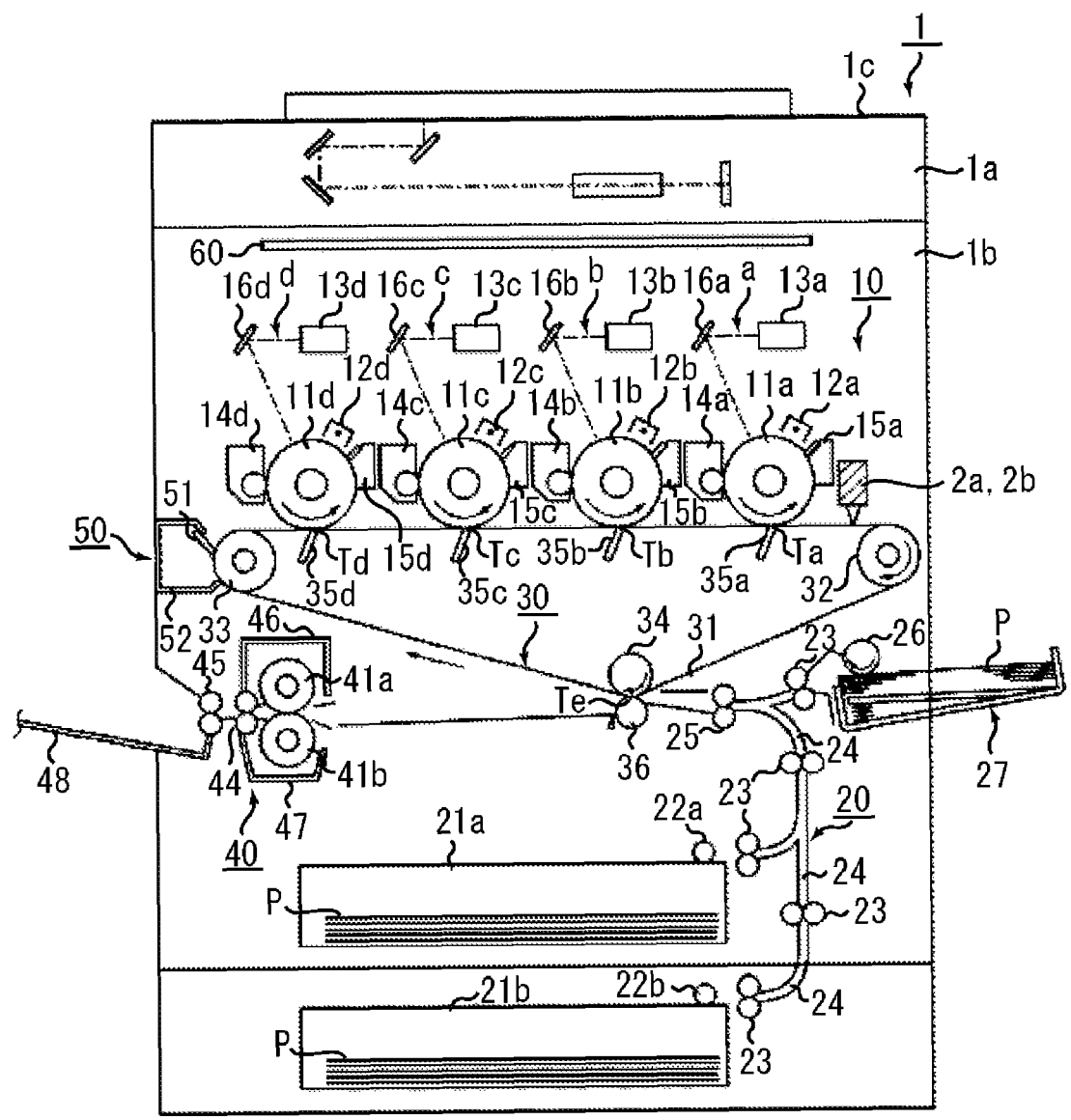
FIG. 1 is a cross-sectional view illustrating a configuration of an image forming apparatus.

FIG. 1 is a cross-sectional view illustrating a configuration of an image forming apparatus according to a first exemplary embodiment of the present invention. In FIG. 1, an image forming apparatus 1 is an electrophotographic color image forming apparatus.

The image forming apparatus 1 includes an image reading unit 1a and an image output unit 1b. The image reading unit 1a optically reads a document placed on a platen glass 1c or a document transferred by an automatic document feeding device (not shown). The image forming apparatus 1 converts read document images into electric signals, and sends the signals to the image output unit 1b.

The image output unit 1b includes an image forming unit 10, a paper feeding unit 20, an intermediate transfer unit 30, a fixing unit 40, a cleaning unit 50, and a control unit 60. The image forming unit 10 includes four stations a, b, c and d, each having the similar structure.

The four stations have a similar structure. The difference is that images formed at respective stations differ in color (black, cyan, magenta, and yellow). Therefore, one station will be described (subscripts "a" to "d" are omitted).

Each station includes a photosensitive drum 11 (image bearing member), which is rotatably driven in the arrow direction. A primary charging unit 12, an optical system 13, a folding mirror 16, a developing unit 14, and a cleaning unit 15 are arranged along the rotating direction of the photosensitive drum 11, facing the external circumferential surface of the photosensitive drum 11. A primary transfer member T is formed at a portion where the photosensitive drum 11 and an intermediate transfer belt 31 are in contact.

The photosensitive drum 11 is charged on its surface uniformly by the primary charging unit 12. Then, the optical system 13 exposes the photosensitive drum 11 with a laser beam, so that an electric latent image is formed on the photosensitive drum 11. The electrostatic latent image is developed as a toner image by the developing unit 14 that contains a developer (hereinafter referred to as "toner"). The cleaning unit 15 cleans the surface of the photosensitive drum 11 by scraping off the toner that remains on the photosensitive drum 11 without being transferred thereto. The toner images of four colors formed at the different stations are transferred sequentially to the intermediate transfer belt 31.

The paper feeding unit 20 includes paper cassettes 21*a* and 21*b* for storing a transfer material (paper sheet) P, and a manual paper feed tray 27. Pickup rollers 22*a*, 22*b* and 26 configured to feed sheets P one by one are provided for the paper cassettes 21*a*, 21*b* and the manual paper feed tray 27 respectively. The paper feeding unit 20 includes paper feed roller pairs 23 and a paper feed guide 24 and a registration roller pair 25, configured to convey a paper sheet P. The registration roller pair 25 temporarily stops the conveyed paper P, and conveys the paper sheet P to a secondary transfer unit Te in appropriate timing with the drive of the intermediate transfer belt 31.

A configuration of the intermediate transfer unit 30 will be described. The intermediate transfer belt 31 is stretched around a driving roller 32, a tension roller 33, and a driven roller 34. The driving roller 32 is rotatably driven by a pulse motor (not illustrated) and a rotating drive force of the driving roller 32 is transmitted to the intermediate transfer belt 31. Primary transfer charging units 35*a* to 35*d* for primary transfer are arranged respectively in the primary transfer portions Ta to Td.

The driven roller 34 and the secondary transfer roller 36 are arranged facing each other on each side of the intermediate transfer belt 31. The secondary transfer portion Te is formed at a nip portion between the intermediate transfer belt 31 and the secondary transfer roller 36.

The cleaning unit 50 includes a cleaning blade 51 contacting the surface of the intermediate transfer belt 31 and a waste toner box 52 configured to store remaining toner scraped off by the cleaning blade 51.

The fixing unit 40 includes a fixing roller 41*a* containing a heat source, such as a halogen heater, a pressure roller 41*b* pressurized by the fixing roller 41*a*, a fixing heat insulating covers 46 and 47 configured to confine the heat, which is generated by the fixing roller 41*a*, within the fixing unit 40. A paper sheet P with an image fixed thereon by the fixing unit 40 is discharged to a discharge tray 48 by an inner discharge roller pair 44, and an outer discharge roller pair 45.

In the image forming apparatus configured as described above, the temperature rises due to the heat from the fixing unit 40, from the heat generated by motors driving the photosensitive drums 11, the driving roller 32, and the pickup rollers 22*a*, 22*b*, and 26, and also by the heat from a power supply circuit to supply electric power to various electrical parts and from many circuit boards. Because of the heat from these heat sources, not only the electrical parts themselves will be damaged, but also the other parts in the image forming apparatus may be adversely affected.

For example, the toner contained in the developing units 14 may be hardened, color misregistration may occur in an output image due to a displacement of the laser beam axis caused by a thermal deformation of the folding mirrors 16, or the output characteristics of the optical sensors 2*a* and 2*b* may change.

Figure 2:
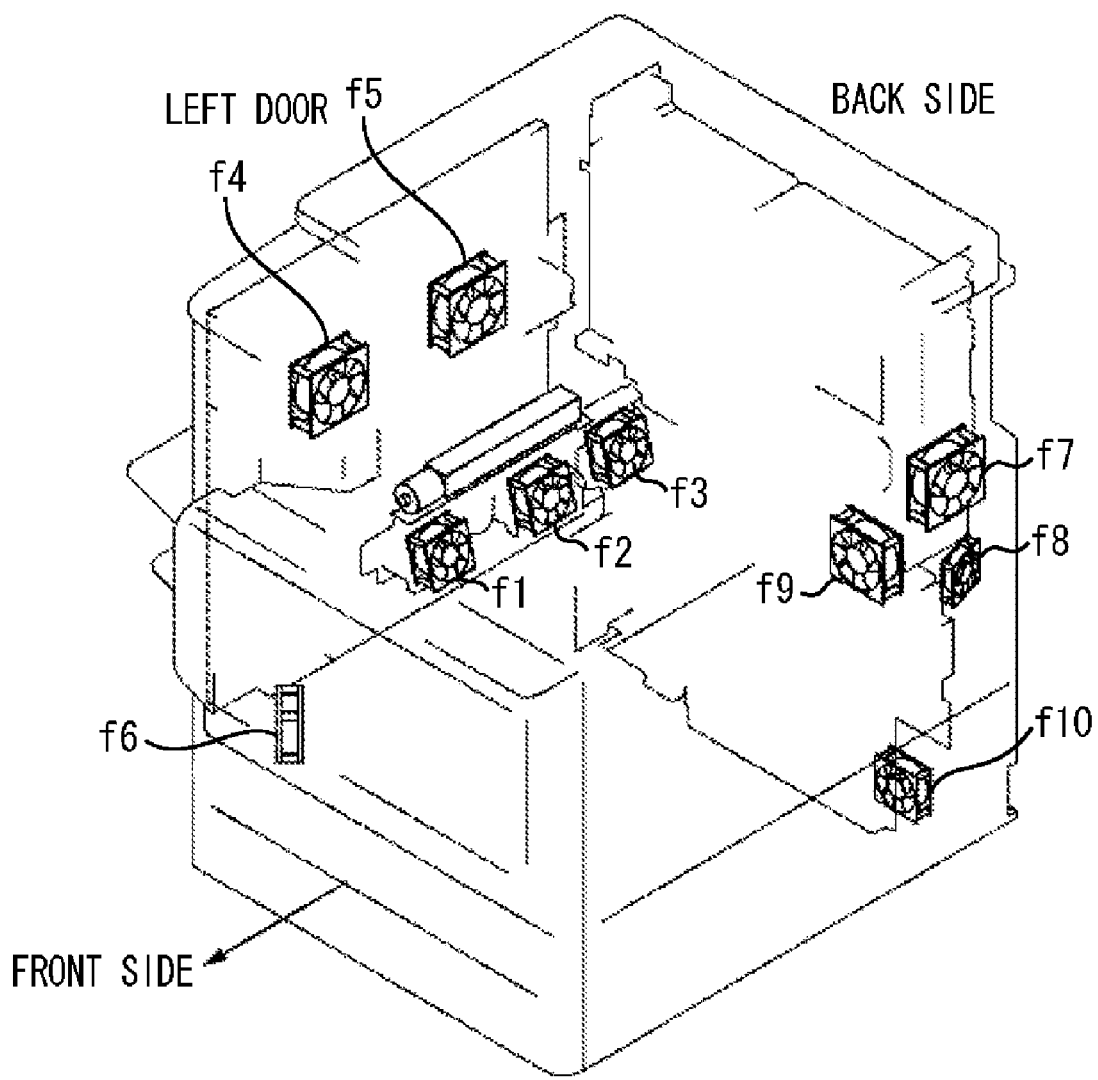
FIG. 2 illustrates positions where fans are mounted in an image forming apparatus.

To reduce the adverse effects described above, as shown in FIG. 2, a plurality of fans (f1 to f10) are arranged in the image forming apparatus to secure a proper air flow in the apparatus to cool the inside of the apparatus. For example, external air is drawn in through fans f1 and f3, and thereby the end portions of the fixing unit 40 are cooled. The air is discharged to the outside of the apparatus by fans f4 and f5. The fan f6 draws in the external air to cool the inside of the apparatus, and the air is discharged by a fan f8 to the outside of the apparatus.

Figure 3:
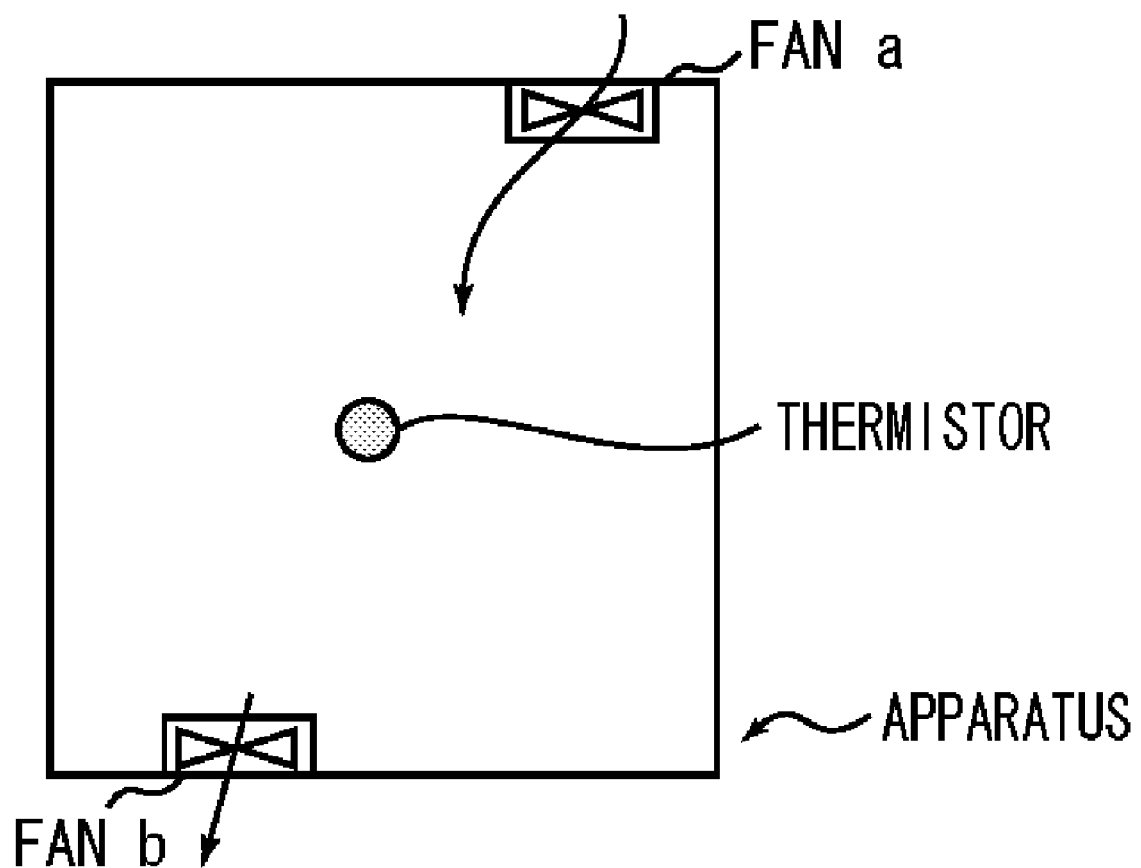
FIG. 3 illustrates an air flow space formed with two fans.

FIG. 3 is a diagram illustrating the fans and the flow of air. The rotation of FAN a is controlled based on a temperature detected by a thermistor in the apparatus. FAN a is controlled so that its rotation will change according to the operating condition of the apparatus. Generally, even when FAN a is controlled to continue rotating at a fixed voltage, the air flow in the apparatus changes according to the environment where the apparatus is installed and the operating condition of the apparatus. FAN b is controlled so that FAN b may rotate in a manner resulting in reduced wind resistance on the blades of the fan according to changes in the state of air flow, in other words, it is controlled so that the air resistance to the fan blades is reduced.

Figure 4:
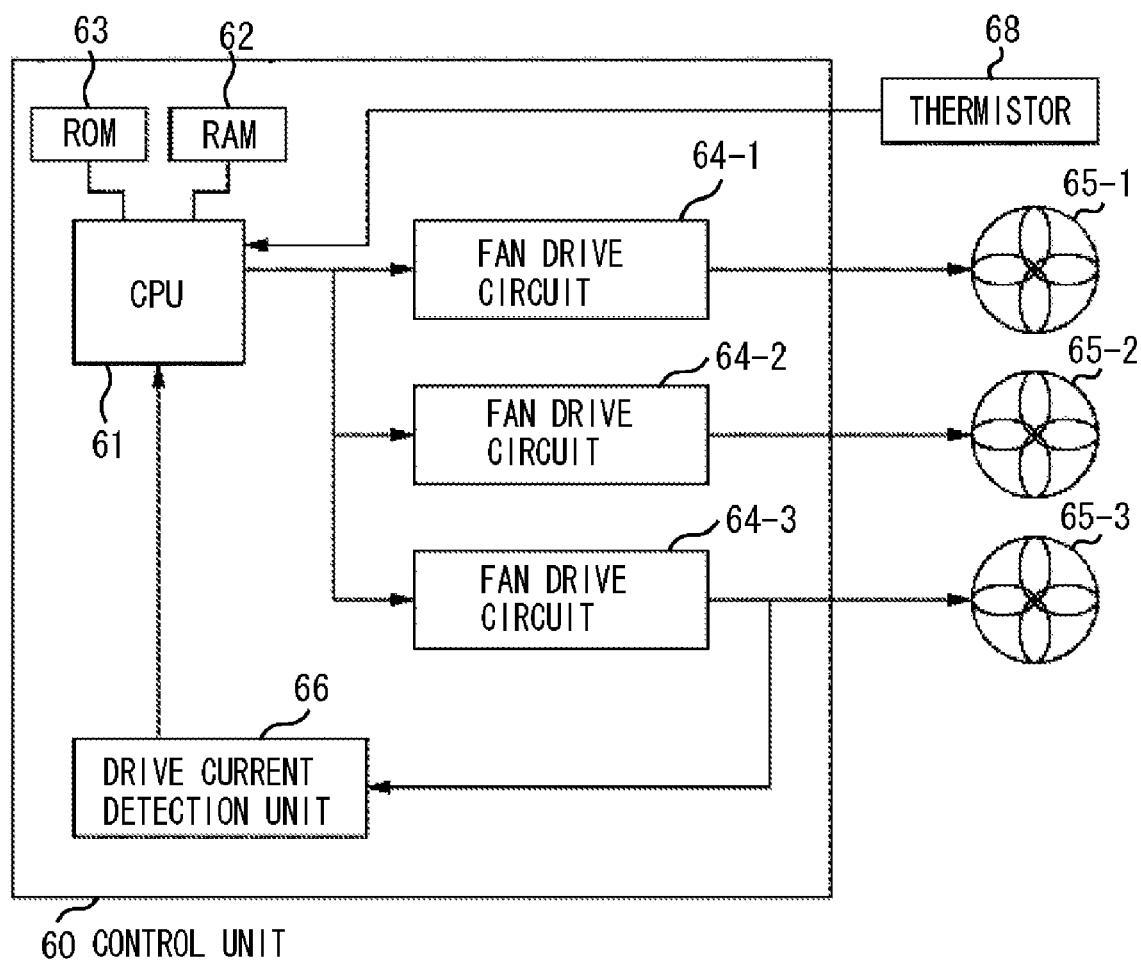
FIG. 4 is a block diagram illustrating a configuration of a fan control unit according to a first exemplary embodiment of the present invention.

FIG. 4 is a block diagram illustrating a fan drive control circuit. A central processing unit (CPU) 61 installed in the control unit 60, in addition to control of the drive of the fans, controls the motors necessary for the image forming operation and also controls an image forming sequence, such as inputting signals from the sensors, performing laser control or the like. A read-only memory (ROM) 63 stores various data and programs necessary to control an image forming sequence and a fan operation. The control unit 60 includes fan drive circuits 64-1 to 64-3 to drive the fans 65-1 to 65-3. The CPU 61 controls the fan drive circuits 64-1 to 64-3 to drive the fans 65-1 to 65-3. The fan drive circuits 64-1 to 64-3 can change the drive voltages of the fans 65-1 to 65-3.

The signal from a thermistor 68 is input to the CPU 61 to detect the temperature at a predetermined location in the apparatus. The detection result of the thermistor 68 is used to control the fan 65-1, for example. The CPU 61 determines whether to drive the fan 65-1 based on detected temperature by the thermistor 68, and controls the inside temperature of the apparatus at a target temperature. The control unit 60 further includes a drive current detection unit 66 to detect the drive current of the fan 65-3. The CPU 61 controls the drive of the fan 65-3 based on a current detected by the drive current detection unit 66. In the exemplary embodiment, the fan 65-2 is mounted at a location where the fan 65-2 gives no influence on the air flow formed by the fans 65-1, 65-3.

As described above, if the state of the air flow space changes influenced by the drive of the fan 65-1, the control unit 60 performs following control described below. The fan 65-1 is not necessarily controlled according to the temperature detected by the thermistor 68. Changes in the state of the air flow space are not necessarily caused by the influence of the drive of the fan 65-1.

As illustrated in FIG. 3, an air flow space is formed by a fan 65-1 (first fan a) and a fan 65-3 (second fan b). The fan 65-1 is installed on the intake side and the fan 65-3 on the exhaust side.

Figure 5:
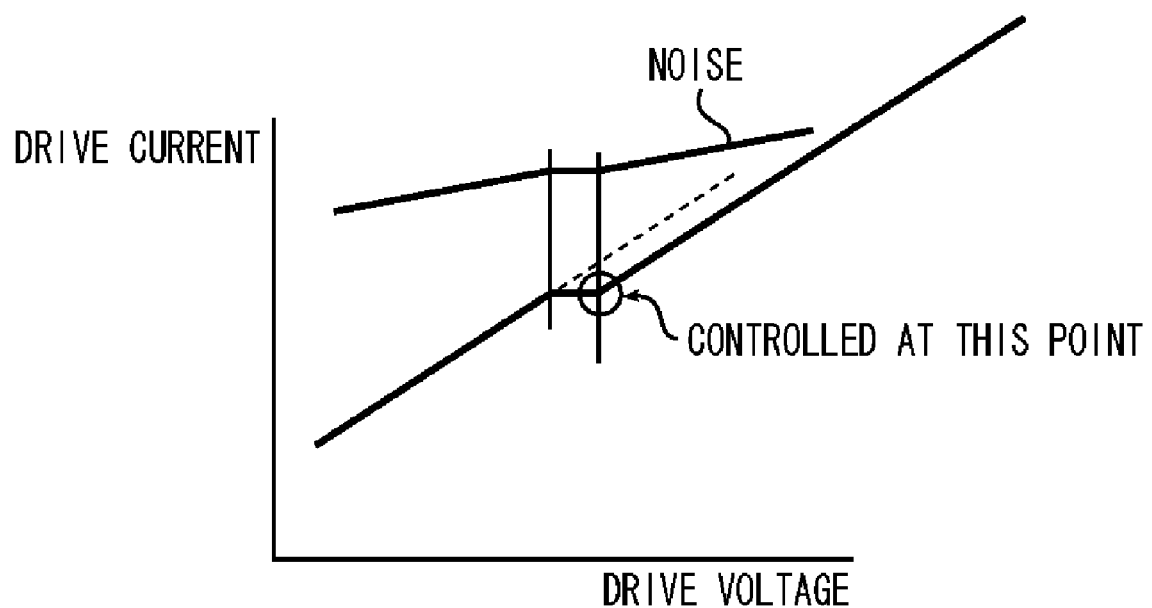
FIG. 5 is a graph representing the relationship between drive voltage and drive current for a fan according to the first exemplary embodiment of the present invention.

FIG. 5 is a graph illustrating a relationship between a drive voltage and a drive current for the fan 65-3. As the drive voltage of the fan 65-3 increases, the drive current increases monotonically in proportion to the drive voltage up to a certain point. At this time, as the air volume increases, the noise (wind noise from the fan 65-3) increases. While the fan 65-1 is taking the air into the apparatus, the blades of the fan 65-3 experience the air resistance from the air taken into the apparatus. Since the rotation number is low when the fan 65-3 is at a low voltage, the exhaust ability of the fan 65-3 is insufficient. The fan 65-3 continues to rotate with the air resistance. When the drive voltage is further increased, a point appears where the current does not increase even if the drive voltage is increased.

At this point, the air resistance received from the air blown from the inside of the apparatus is counterbalanced with the air volume discharged by the fan 65-3. Therefore, even though the rotation number is increased, the air resistance applied to the blades of the fan 65-3 decreases. Consequently, extra power is not required to drive the fan 65-3, and the air volume increases without increasing the current. Moreover, at this point, as described above, the air resistance applied to the fan blades decreases, which allows the air to flow smoothly. As a result, the wind noise from the fan 65-3 decreases.

If the drive voltage is still further increased, the drive current increases monotonically again. Under this condition, the rotation number of the fan 65-3 is increased more than necessary for the air resistance acting on the fan blades. Therefore, an extra load is applied to the blades of the fan 65-3, and excessive energy continues to be consumed. In addition, as extra air resistance is applied on the blades of the fan 65-3, the wind noise from the blades increases.

As illustrated in FIG. 5, while the drive voltage increases, the drive current suddenly stops increasing (or the increasing rate of the drive current becomes smaller), and then the drive current again starts to increase. Therefore, it is desirable that the fan 65-3 is driven at the voltage value at which the drive current stops increasing as described above. By using this drive voltage, it is possible to implement fan control that secures a sufficient air volume and reduces noise. By this method, excess power consumption can be suppressed. If the fan 65-3 generates larger noise than the fan 65-1, the above-described control can be more effective.

FIG. 6 is a diagram illustrating the relationship among the drive voltage, drive current, and amount of drive current increase for the fan 65-3. When the CPU 61 increases the fan drive voltage at fixed intervals (0.5V), the drive current increases by 1.5 mA. However, when the drive voltage reaches a certain point, the drive current increases by 0.5 mA and after this, the drive current again increases by 1.5 mA. By monitoring the drive current increase with respect to the increase in the drive voltage, the optimum drive voltage value of the fan 65-3 is determined to be 23 V. The fan can be driven with high efficiency at this optimum voltage value.

Figure 7:
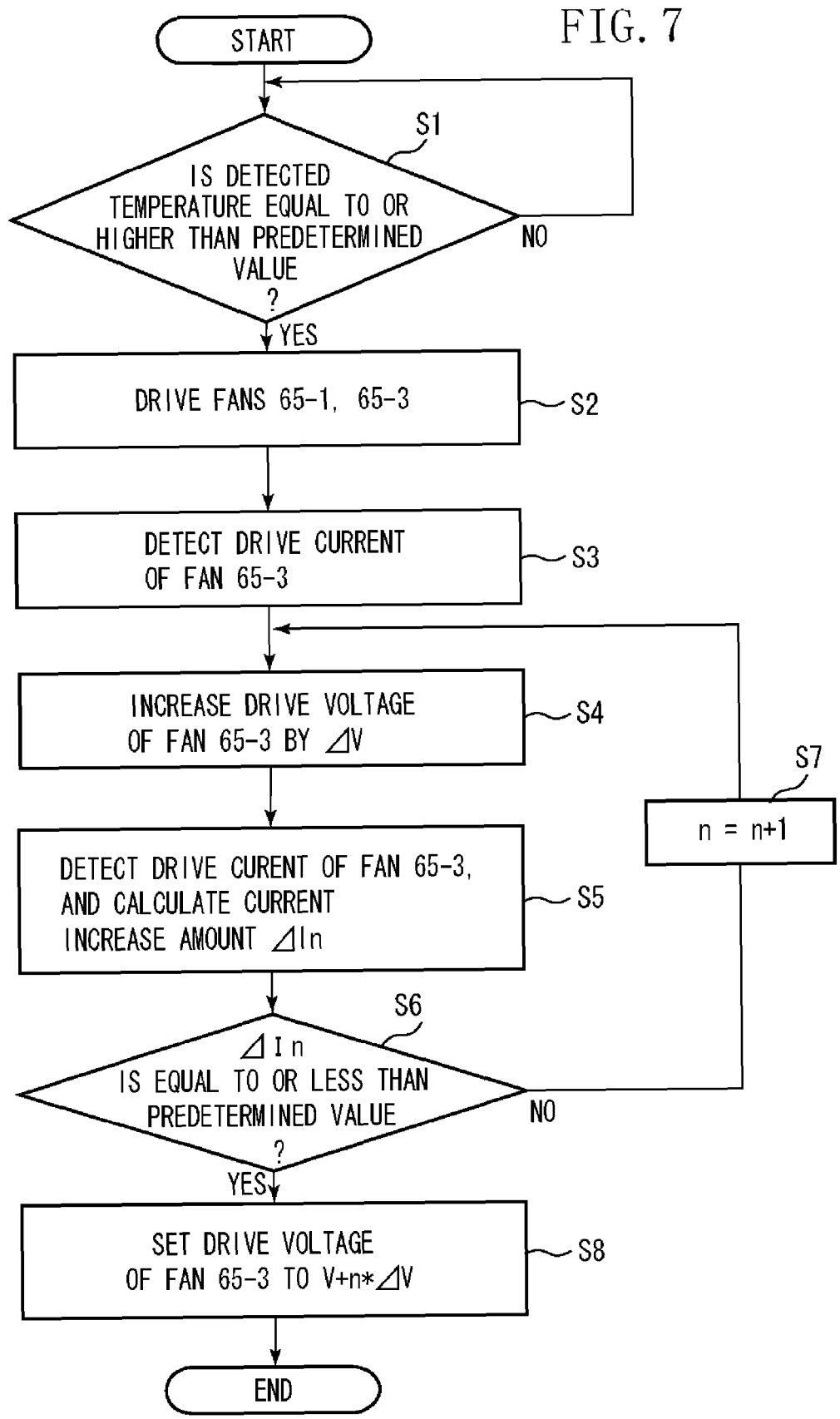
FIG. 7 is a flowchart illustrating a drive control procedure of a fan according to the first exemplary embodiment of the present invention.

FIG. 7 is a flowchart illustrating a drive control procedure of a fan. The CPU 61 executes the fan drive control procedure illustrated in FIG. 7 according to a program stored in the ROM 63.

In step S1, the CPU 61 determines if the detected temperature of the thermistor 68 is equal to or higher than a predetermined temperature. If the detected temperature is equal to or higher than the predetermined temperature (YES in step S1), then in step S2, the CPU 61 outputs a command to the fan drive circuits 64-1 and 64-3 directing them to drive the fans 65-1 and 65-3 at a voltage "V," respectively. The fan 65-1 may be driven at any other voltage. Since drive control of the fan 65-2 is independent of drive control of the fans 65-1, 65-3, description of the drive control of the fan 65-2 is omitted. By using the drive current detecting unit 66, in step S3, the CPU 61 detects the drive current of the fan 65-3 when the drive voltage of the fan 65-3 is "V" volts, and stores the detected current value in a RAM 62.

In step S4, the CPU 61 outputs a command to the fan drive circuit 64-3 to increase the drive voltage of the fan 65-3 by $\Delta V$. In step S5, the CPU 61 detects the drive current of the fan 65-3 by the drive current detection unit 66, and calculates an amount of change in current (current increase) $\Delta In$ (n=1, 2, 3, ...) based on the result of previous detection in step S5. A newly detected drive current value and the current increase $\Delta In$ are stored in the RAM 62.

In step S6, the CPU 61 determines if the calculated current increase $\Delta In$ is equal to or less than a predetermined value. For example, if it can be previously estimated that a mean value of $\Delta In$ is about 2 mA, 1 mA is set as a predetermined value. A value half as much as the previously calculated current increase may be set without determining the value in advance. In step S6, if the current increase $\Delta In$ is equal to or less than the predetermined value (YES in step S6), then in step S8, the CPU 61 sets the drive voltage of the fan 65-3 at $V+n\times\Delta V$ as the drive voltage at the moment. Then, the sequence of determining a drive voltage of the fan is finished. In step S6, if the current increase $\Delta In$ is more than the predetermined value (NO in step S6), in step S7, the CPU 61 increases the variable "n" that indicates the number of times of increase by one, and the process returns to step S4, and steps S4 to S7 are repeated.

The drive voltage maximum value (Vmax) can be determined in advance to increase the drive voltage by $\Delta V$. When the drive voltage reaches Vmax, if the current increase $\Delta In$ does not become less than a predetermined value, a drive voltage is used when the current increase, which is stored in the RAM 62 at every execution of this procedure, becomes minimum.

By controlling the fan rotation drive as described above, the fans can be rotated with maximum fan rotation efficiency and the noise reduction of the apparatus can be achieved.

The fan drive apparatus is capable of supplying sufficient air volume to cool the components within an apparatus with reduced power consumption. Additionally, the fan drive apparatus enables silent operation while supplying sufficient air volume to cool the components within an apparatus. In the present exemplary embodiment, the image forming apparatus has been described, but the present invention is not limited to the image forming apparatus, and can be applied to devices and apparatuses in which fans are installed.

In the first exemplary embodiment, current increase is detected by using the drive current detection unit 66. In a second exemplary embodiment, an amount of increase in rotation number of a fan is detected.

Figure 8:
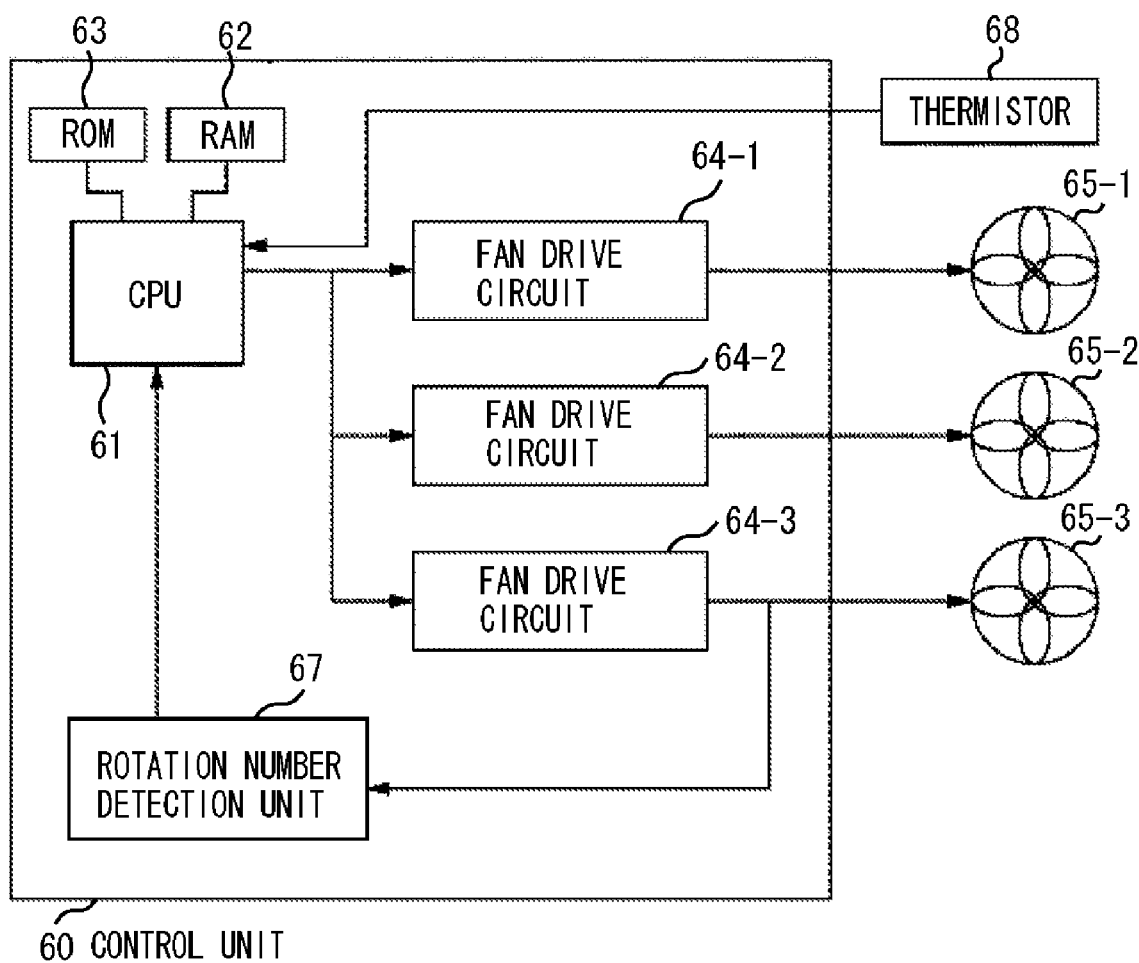
FIG. 8 is a block diagram illustrating a configuration of a fan control unit according to a second exemplary embodiment of the present invention.

FIG. 8 is a block diagram illustrating a configuration of the control unit 60 in the second exemplary embodiment. The components similar to those in the first exemplary embodiment will be designated by the same numbers and their detailed descriptions are omitted.

The CPU 61 detects a rotation number of the fan 65-3 by a rotation number detection unit 67.

Figure 9:
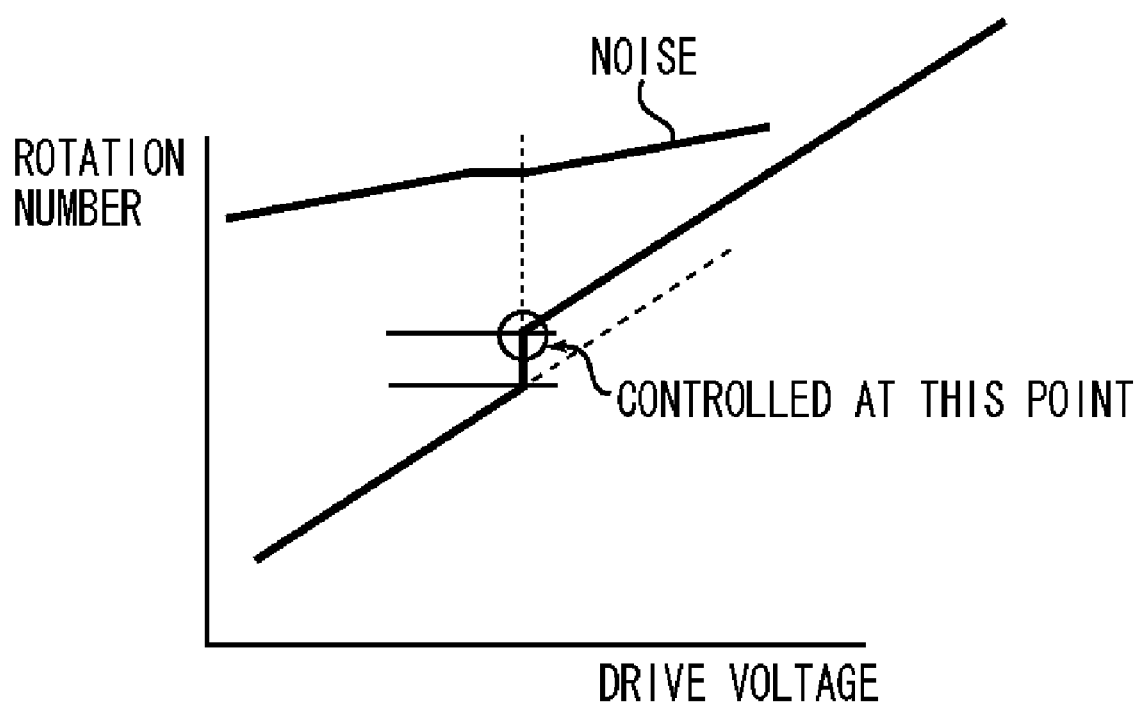
FIG. 9 is a graph representing the relationship between drive voltage and rotation number in the second exemplary embodiment of the present invention.

FIG. 9 is a graph illustrating a relationship between drive voltage and rotation number for the fan 65-3. As the drive voltage of the fan 65-3 increases, the rotation number monotonically increases to a certain point in proportion to the drive voltage. During this period, as the air volume increases, the noise (the wind noise from the fan 65-3) increases. As the drive voltage further rises, a point appears where the number of fan rotations increases sharply. At this point, for the reason described in the first exemplary embodiment, the drive voltage stops rising while the rotation number increases. As described above, the air resistance against the fan blades decreases. As the air flows, the wind noise from the fan 65-3 decreases. As the drive voltage further increases, the rotation number increases monotonically.

Under this condition, as the rotation number is unnecessarily high against the air resistance received from the inside of the apparatus, the blades of the fan 65-3 receive excessive load. Therefore, excessive energy is consumed. Since extra air resistance is applied to the blades of the fan 65-3, the wind noise further increases. Consequently, the drive voltage value at which the rotation number increases sharply while the drive voltage of the fan 65-3 is increased is optimum. When the fan is driven at this drive voltage, sufficient air volume can be obtained and the noise can be reduced. By using this drive method, wasteful power consumption can be reduced. When wind noise from the fan 65-3 is larger than that of the fan 65-1, this control method is more effective.

FIG. 10 is a table illustrating a relationship among drive voltage, fan rotation number, and amount of increased number of rotations for the fan. When the CPU 61 increases the drive voltage of the fan by a fixed voltage (0.5V), the rotation number increases by 65 rpm, and at a certain point (at drive voltage from 22.5 V to 23 V), the amount of the rotation number increase is 100 rpm. Subsequently, the rotation number keeps increasing by 65 rpm. By detecting variation of the increased amount in the rotation number as described above, 23V is determined to be the optimum value as the fan drive voltage, and therefore the fan can be driven with high efficiency.

FIG. 11 is a flowchart illustrating drive control of a fan in the second exemplary embodiment. The steps of this flowchart are executed by the CPU 61 according to a program stored the ROM 63.

In step S11, the CPU 61 determines if the detected temperature of the thermistor 68 is equal to or higher than a predetermined temperature. If the detected temperature is equal to or higher than a predetermined temperature (YES in step S11), in step S12, the CPU outputs a command to the fan drive circuits 64-1, 64-3 to drive the fans 65-1, 65-3 at a voltage "V" respectively. The fan 65-1 may be driven at any other voltage. Since drive control of the fan 65-2 is independent of the drive control of the fans 65-1, 65-3, description of the control of the fan 65-2 is omitted. By using the rotation number detection unit 67, in step S13, the CPU 61 detects a rotation number of the fan 65-3 when the drive voltage of the fan 65-3 is a voltage "V," and stores a detected rotation number value in a RAM 62.

In step S14, the CPU 61 outputs a command to the fan drive circuit 64-3 to increase the drive voltage of the fan 65-3 by ΔV. In step S15, the CPU 61 detects a rotation number of the fan 65-3 by the rotation number detection unit 67, and calculates a variation (amount of rotation number increase) ΔRn (n=1, 2, 3, ... ) from the result of previous detection. A newly detected rotation number value and the amount of the rotation number increase ΔRn are stored in the RAM 62.

In step S16, the CPU 61 determines if the calculated amount of the rotation number increase ΔRn is equal to or higher than a predetermined value. For example, if it can be previously estimated that a mean value of ΔRn is about 65 rpm, 90 rpm is set as a predetermined value. Alternatively, a value 1.5 times as much as the previously calculated rotation number increase can be set without setting a fixed value. In step S16, if the rotation number increase ΔRn is equal to or higher than a predetermined value (YES in step S16), in step S18, the CPU 61 sets the drive voltage of the fan 65-3 at V+n×ΔV as the drive voltage at the moment. Then, the sequence of determining a drive voltage of the fan is finished.

In step S16, if the amount of the rotation number increase ΔRn is less than a predetermined value (NO in step S16), in step S17, the CPU 61 increases a variable "n" that indicates a number of times of increase by one. Then, the processing returns to step S14, and steps S14 to S17 are repeated.

A maximum value Vmax may be previously determined for the drive voltage. Even when the drive voltage reaches the maximum value Vmax while increasing the drive voltage by ΔV, if the amount of the rotation number increase ΔRn is not equal to or higher than a predetermined value, a drive voltage in which the amount of the rotation number increase has been the maximum can be used for driving, which is selected from detection results stored at every detection in the RAM 62.

By controlling the fan rotation drive as described above, the fans can be rotated with maximum fan rotation efficiency and the reduction of the noise of the apparatus can be achieved.

In the present exemplary embodiment, the image forming apparatus has been described, but the present invention is not limited to the image forming apparatus, and can be applied to devices and apparatuses in which the fans are installed.

Both in the first and second exemplary embodiments of the present invention, the optimum drive voltage is obtained by changing the drive voltage of the fans when the image forming apparatus is in operation. However, the optimum voltage can be obtained by previously conducting experiments and storing data in the ROM 63. Then, while the image forming apparatus is operating, the fan 65-3 can be driven with a drive voltage stored in the ROM 63. In this way, apparatuses and devices with reduced noise and power consumption can be obtained without performing the sequence of searching for an optimum drive voltage by changing the drive voltage during the operation of the apparatuses. In the first and second exemplary embodiments, the driving voltage applied to the fan 65-3 is controlled. However, the driving voltage applied to the fan 65-1 may be controlled.

The air flow condition in an apparatus or device may change by human actions, such as opening and closing of the door or the cover of the apparatus even if the air flow condition is not affected by the operating conditions. For example, the front cover (not illustrated) of the apparatus may be opened when the intermediate transfer belt 31 is changed. Therefore, there is a possibility that the air flow condition in the apparatus is changed after the replacement work is completed. Therefore, generally, the fan 65-3 is driven at a drive voltage determined in advance. Then, at timing when the interior condition may change in such a case as after the door is opened or closed, and the power supply is turned on or off, control according to the first or second exemplary embodiment can be performed to enable the fans to be operated at an optimum point during the operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-171734 filed Jun. 30, 2008, which is hereby incorporated by reference herein in its entirety.

What is claimed is:
1. A fan drive apparatus comprising:
a first fan;
a second fan configured to form an air flow space, which has an intake side and an exhaust side, in cooperation with the first fan;

a first drive circuit and a second drive circuit configured to output drive voltages to drive the first fan and the second fan respectively;

a current detection unit configured to detect a drive current for the second drive circuit when the first fan and the second fan are driven; and a control unit configured to control the second drive circuit to change the drive voltage applied to the second fan, and determine a drive voltage so that a variation amount of the drive current detected by the current detection unit with respect to a change of the drive voltage is equal to or less than a predetermined value.

2. The fan drive apparatus according to claim 1, wherein the control unit controls the second drive circuit to drive the second fan with a determined drive voltage.

3. The fan drive apparatus according to claim 1, wherein the first fan is arranged on the intake side and the second fan on the exhaust side.

4. The fan drive apparatus according to claim 1, wherein the control unit controls the second drive circuit to increase the drive voltage for the second fan by a predetermined voltage until the variation of the drive current with respect to the change of the driven voltage is equal to or less than the predetermined value.

5. A fan drive apparatus comprising:

a first fan;

a second fan configured to form an air flow space, which has an intake side and an exhaust side, in cooperation with the first fan;

a first drive circuit and a second drive circuit configured to output drive voltages to drive the first fan and the second fan respectively;

a rotation number detection unit configured to detect a rotation number of the second fan when the first fan and the second fan are driven; and a control unit configured to control the second drive circuit so as to change the drive voltage applied to the second fan, and determine a drive voltage so that a variation amount of the rotation number detected by the rotation number detection unit with respect to a change of the drive voltage is equal to or more than a predetermined value.

6. The fan drive apparatus according to claim 5, wherein the control unit controls the second drive circuit to drive the second fan with a determined voltage.

7. The fan drive apparatus according to claim 5, wherein the first fan is arranged on the intake side and the second fan is arranged on the exhaust side.

8. The fan drive apparatus according to claim 5, wherein the control unit controls the second drive circuit to increase the drive voltage for the second fan by a predetermined voltage until the variation amount of the rotation number with respect to the change of the driven voltage is equal to or more than the predetermined value.

9. An image forming apparatus comprising:

an image forming unit configured to form an image on a sheet;

a first fan configured to cool an interior of the image forming apparatus;

a second fan configured to form an air flow space, which has an intake side and an exhaust side, in cooperation with the first fan;

a first drive circuit and a second drive circuit configured to output drive voltages to drive the first fan and the second fan respectively;

a current detection unit configured to detect a drive current for the second drive circuit when the first fan and the second fan are driven; and a control unit configured to control the second drive circuit to change the drive voltage applied to the second fan, and determine a drive voltage so that a variation amount of the drive current detected by the current detection unit with respect to a change of the drive voltage is equal to or less than a predetermined value.

10. The image forming apparatus according to claim 9, wherein the image forming unit is configured to form a color image on a sheet.

11. An image forming apparatus comprising:

an image forming unit configured to form an image on a sheet;

a first fan configured to cool an interior of the image forming apparatus;

a second fan configured to form an air flow space, which has an intake side and an exhaust side, in cooperation with the first fan;

a first drive circuit and a second drive circuit configured to output drive voltages to drive the first fan and the second fan respectively;

a rotation number detection unit configured to detect a rotation number of the second fan when the first fan and the second fan are driven; and a control unit configured to control the second drive circuit to change the drive voltage applied to the second fan, and determine a drive voltage so that a variation amount of the rotation number detected by the rotation number detection unit with respect to a change of the drive voltage is equal to or more than a predetermined value.

12. The image forming apparatus according to claim 11, wherein the image forming unit is configured to form a color image on a sheet.

* * * * *